United States Patent [19]

Oden

[11] 4,298,138
[45] Nov. 3, 1981

[54] TANDEM COLUMN VENDER APPARATUS

[75] Inventor: Kenneth W. Oden, Charles Town, W. Va.

[73] Assignee: Dixie-Narco, Inc., Ranson, W. Va.

[21] Appl. No.: 125,923

[22] Filed: Feb. 29, 1980

[51] Int. Cl.³ .............................................. B65G 59/00
[52] U.S. Cl. ................................... 221/115; 221/116; 221/266
[58] Field of Search ............... 221/112, 115, 116, 296, 221/289, 291, 266, 114, 117, 118, 133, 93

[56] References Cited
U.S. PATENT DOCUMENTS

| | | | |
|---|---|---|---|
| 1,694,599 | 12/1928 | Lea | 221/116 X |
| 1,713,333 | 5/1929 | Economos | 221/115 X |
| 1,729,886 | 10/1929 | Massie | 221/115 |
| 2,156,196 | 4/1939 | Romanoski | 221/116 X |
| 2,895,639 | 7/1959 | Little | 221/266 |
| 3,421,657 | 1/1969 | Larson | 221/115 X |

FOREIGN PATENT DOCUMENTS 592932  2/1960  Canada ................................ 221/112

*Primary Examiner*—Allen N. Knowles
*Attorney, Agent, or Firm*—Bacon & Thomas

[57] ABSTRACT

A rotary cradle extends from front to back of a compartment for holding columns of articles to be dispensed. The cradle is of generally semi cylindrical hollow shape having a straight axial leading edge and a stepped trailing edge and mounted to be rotated about its cylinder axis. The cradle is free of internal partitions and is adapted for sequentially dispensing front and then rear articles from front and rear columns of articles in the compartment, or for dispensing single longer articles. A removable support in the cradle holds long narrow articles at the proper height for supporting a column of those articles in the compartment at the proper elevation for the straight leading edge of the cradle to isolate and support the column while dispensing an article in the cradle.

7 Claims, 11 Drawing Figures

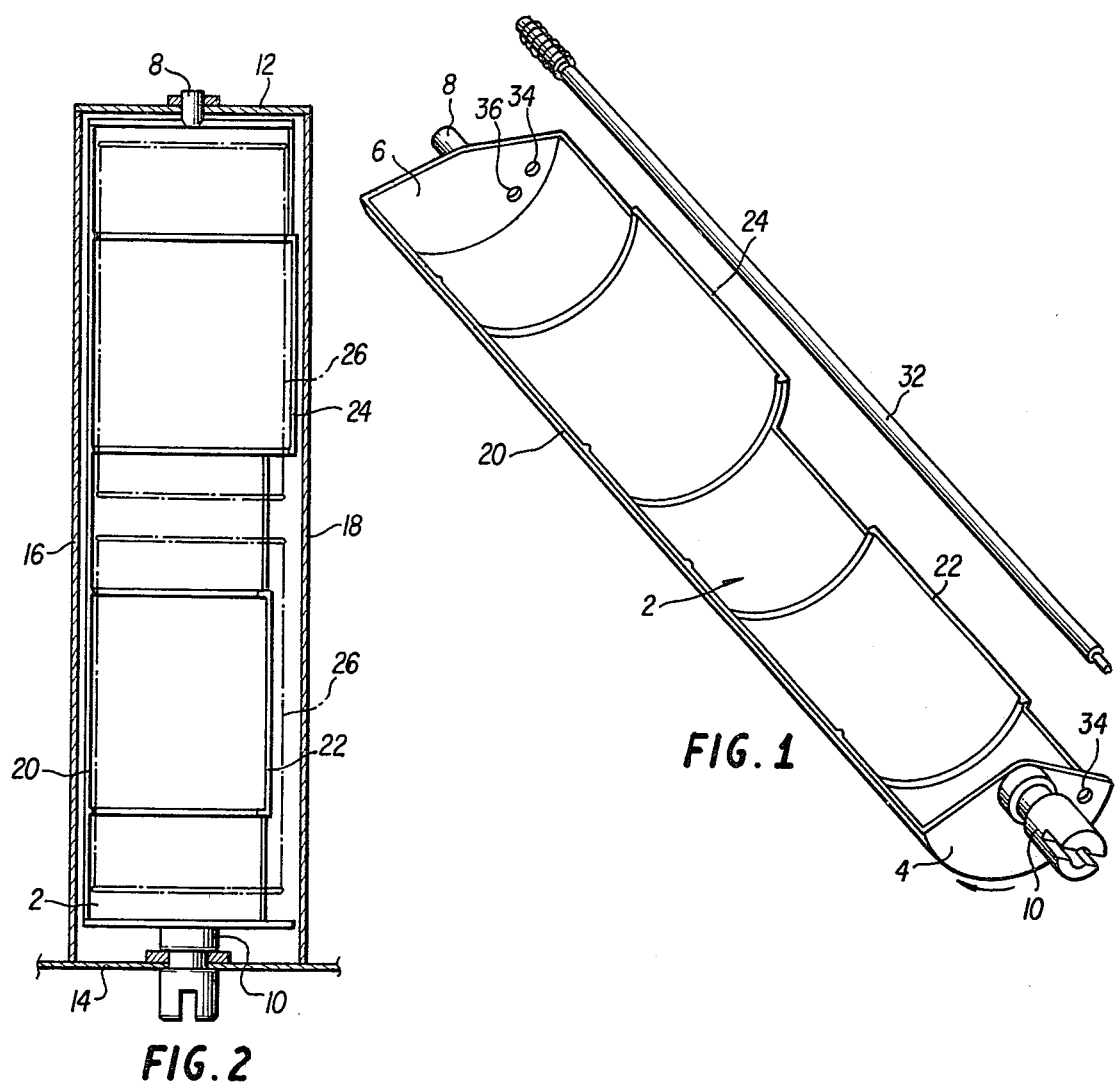
FIG. 1
FIG. 2
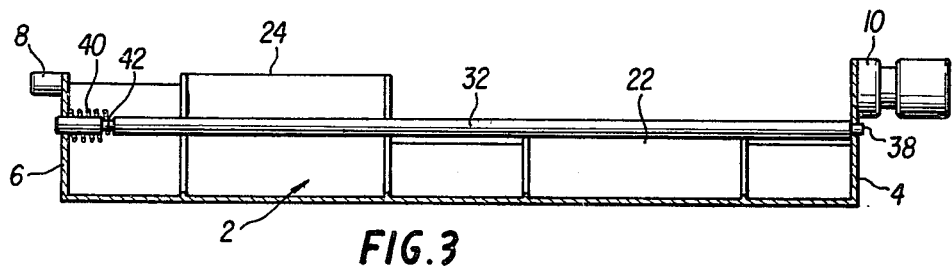
FIG. 3
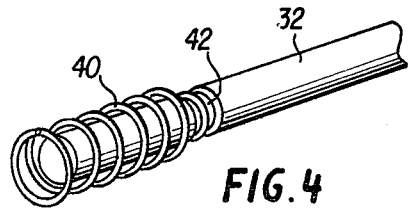
FIG. 4

TANDEM COLUMN VENDER APPARATUS

BACKGROUND OF THE INVENTION

This invention is in the field of vending or dispensing devices adapted to dispense cylindrical articles.

Vending machines have already been proposed for vending cylindrical articles from front and rear columns of the articles in the same compartment. See the following United States Pat. Nos.: Lea, 1,694,599; Massie, 1,729,886; Romanoski, 2,156,196; Larson, 3,421,657; and Payne, 3,424,345. The above patents all employ generally semicylindrical cradles mounted for rotation about their axis under a column of articles. Articles enter the cradle and as the cradle rotates, the articles are dispensed. In each case, the cradle is compartmented so that front and rear articles drop into their respective compartments, and the devices are thus limited for use with articles of a specific size, and no provision is made for adapting those devices for dispensing a different type or size of cylindrical article.

SUMMARY OF THE INVENTION

The present invention employs a single semicylindrical cradle mounted for rotation below either a single column or front and rear columns of different articles to be dispensed. The cradle is free of partitions, so that it can receive either a pair of shorter cylindrical articles, such as cans of beverage or a single longer article such as a bottle of beverage. When adapted to dispense articles from front and rear columns, the cradle is rotated through a part revolution at which time the leading edge at the front of the cradle becomes spaced from a sidewall a distance at least equal to the diameter of its article, and that article may drop to a dispensing station. Upon the next actuation, the cradle is rotated further to bring the corresponding edge of the rear part of the cradle to a sufficiently spaced relation from the compartment sidewall to let the rear article drop to the delivery station. The leading edge of the cradle enters between those articles in the cradle and the columns thereabove to support the articles in the columns above the cradle during the dispensing cycles.

An attachment is provided to be placed in the cradle to hold articles of smaller diameter, but greater length, such as bottles, at a proper height to support the column thereabove at such elevation that the leading edge of the cradle will enter between the article in the cradle and the articles thereabove to support the latter without having to unduly lift the weight of the column during rotation of the cradle. When employed to dispense bottles, as will be described, the motor or driving mechanism is so adapted that it rotates the cradle one complete revolution from each cycle of operation, whereas when dispensing cans sequentially from front and rear columns, the motor operates through only a partial rotation of the cradle after dispensing the front article and before delivering the article from the rear column.

BRIEF DESCRIPTION OF THE DRAWINGS

In the drawings, FIG. 1 is a perspective view of a cradle embodying the present invention;

FIG. 2 is a top plan view of the cradle of FIG. 1 showing the same mounted in a compartment of a vending machine, as seen from the line 2—2 of FIG. 5;

FIG. 3 is a vertical sectional view through a portion of the cradle of FIG. 1 with the adapter attachment mounted therein;

FIG. 4 is a fragmentary perspective view of an end of the adapter attachment;

DESCRIPTION OF A PREFERRED EMBODIMENT

Figure 5:
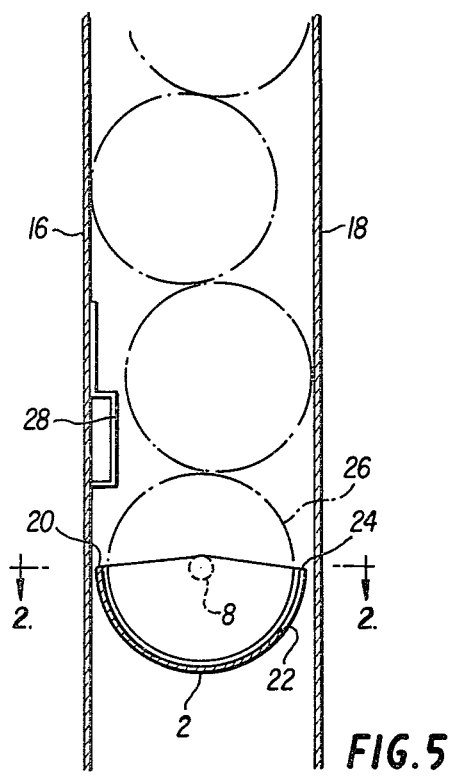
FIGS. 5, 6, 7 and 8 are sequential views schematically showing the steps in dispensing front and rear articles from front and rear columns.

In FIG. 1, numeral 2 designates the rotary cradle of the present invention, and it is to be noted that when mounted in a vending machine, the cradle will be rotated in a clockwise direction as viewed from the near end, in the direction indicated by the arrow. For supporting the cradle in the vending machine, it is provided with end walls 4 and 6 and stub shafts 8 and 10 by which it is rotatably mounted in end walls 12 and 14, respectively, in a compartment (FIG. 2) of a suitable vending machine cabinet. The compartment is further defined by sidewalls 16 and 18. The forward end of the stub shaft 10 is configured to be engaged by a suitable driving mechanism (not shown) which will be referred to later.

It is to be noted that the leading edge of the cradle 2 defines a straight edge 20, whereas its trailing edge is stepped to define a front step 22 and a rear step 24. The steps 22 and 24 being of different circumferential extent for a purpose to be described. It is to be noted that the cradle 2 is not provided with any internal partitions or separating means, but is of sufficient length to receive a pair of cans 26 from columns of the cams in the compartment and extending above the cradle. The region of the compartment below the cradle leads to or may itself be a delivery station for delivery of the articles to a purchaser.

Referring now to FIGS. 5-8, FIG. 5 shows schematically how the apparatus appears from the front between cycles of operation. As seen, the cradle 2 is stopped with its open side uppermost, and with the step 24 being substantially at the same level as the straight leading edge 20 of the cradle. When the mechanism is actuated to dispense a single can from the apparatus, the cradle is first rotated to substantially the position shown in FIG. 6, wherein its step 22 is sufficiently spaced from compartment wall 18 to permit the can in the front part of the cradle to drop, as indicated, to the dispensing or delivery station. At the same time, a straight leading edge 20 of the cradle has moved between the cans in the cradle, and those in the column thereabove to support the latter while dispensing takes place. When the parts reach the position shown in FIG. 6, the motor is stopped and the apparatus is thus quiescent until the next cycle of operation is initiated. In this position, it is to be noted that the step 24 is still sufficiently close to the compartment wall 18 to prevent the rear can 26′ from dropping therefrom and that rear can is held in the cradle until the next cycle of operation is initiated.

Figure 7:
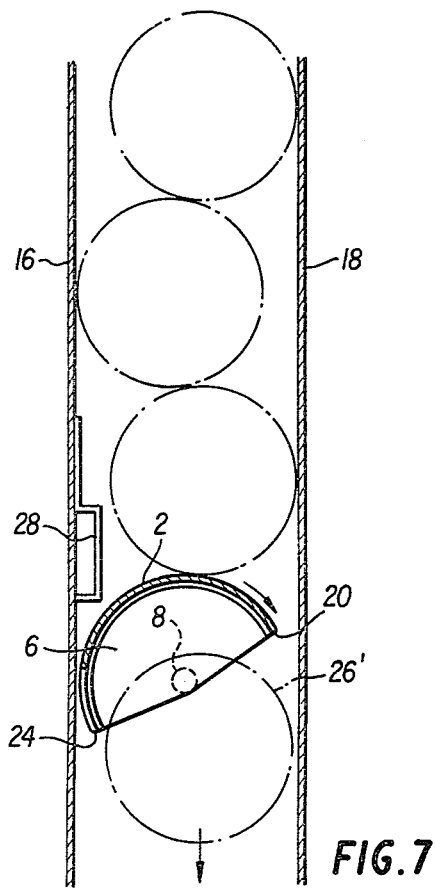

The next cycle of operation is indicated in FIG. 7 wherein the cradle 2 has been further rotated in a clockwise direction, sufficiently far, so that the step 24 now permits the rear can 26′ to drop to the delivery station, and during this time the cylindrical wall of the cradle 2 has held both columns of articles above the cradle in their upper position, and prevents their dropping to the delivery station.

Figure 8:
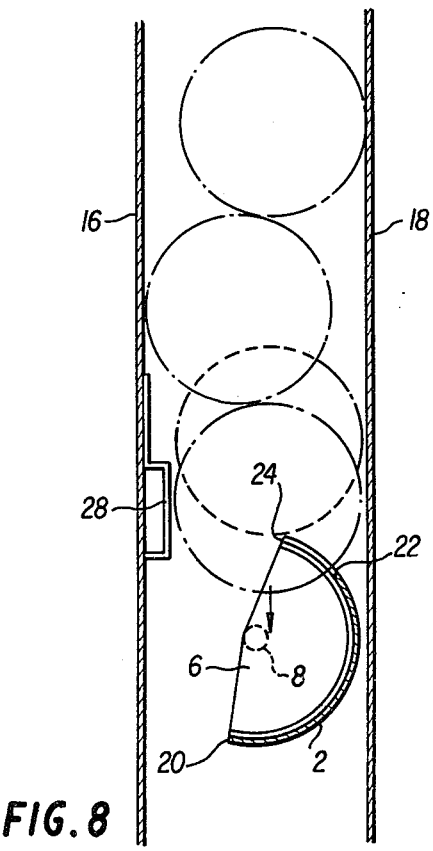

After the parts pass the position shown in FIG. 7, rotation is continued until they reach the position shown in FIG. 8, at which time the front step 22 has passed the center line of the column of articles in the column thereabove and the front can has dropped slightly while the step 24 still holds the rear column in its elevated position. Continued rotation in a clockwise direction from the position of FIG. 8 will first permit the step 22 to move downwardly and to the right far enough to permit the front can to drop into the cradle and thereafter the rear can also drop into the cradle to re-establish the conditions shown in FIG. 5 at which time the rotation of the cradle is stopped pending the next cycle of operation.

Removably mounted on the sidewall 16 of the compartment guiding the columns of articles is a shim or projection member 28. If reference is made to FIG. 6 or FIG. 7, it will be seen that the cans in the column above the cradle are capable of considerable lateral movement and the bottom can of that column could come to rest on the can in the cradle in a position adjacent the sidewall 16 of the compartment. In that case, the leading edge 20 of the cradle when operating in its first cycle of operation, would impinge on a side portion of the lowermost can in the column above the cradle, and this would necessitate exerting considerable force to lift the entire column to permit the cradle wall to pass thereunder to the position shown in FIG. 6 for supporting the same. The projection 28 forces the lowermost can in the column above the cradle to take a position to the right as seen in FIG. 5, thus minimizing any lifting effort that must be exerted by the leading edge of the cradle in passing between those articles in the cradle and those thereabove.

When the cradle rotates to let a new set of cans drop into it, as described, the steps which let the cans down are the same steps that vend the cans and therefore not a straight edge, but stepped in the manner described. Since no dividers or partitions are employed, cans can be loaded rapidly, but one set may be all the way back in the compartment and some all the way forward. As the front column lets down ahead of the back column, these overlaps could cause the cans in the front column to cock severely if they drop down a full diameter before the rear column drops. The projection 28 already described also solves this problem. The projection is in the front column area only. This pushes the front cans over to the right and closes down the columns which make the cradle rotate further before the front can drops in, instead of the front row dropping the full can diameter before the back row drops. Thus, there is less than a half can diameter of overlap (see FIG. 8) and any cocking that occurs levels up when the back row drops.

Figure 9:
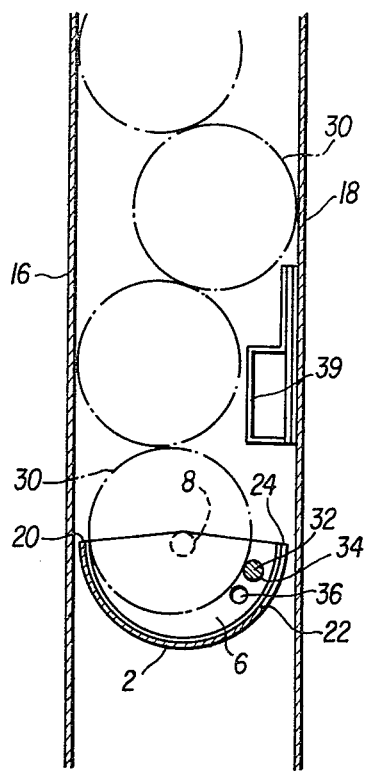
FIGS. 9, 10 and 11 are views similar to FIGS. 6-8, but showing the apparatus when dispensing single articles, such as bottles, from a single column in the compartment of the apparatus.
Figure 10:
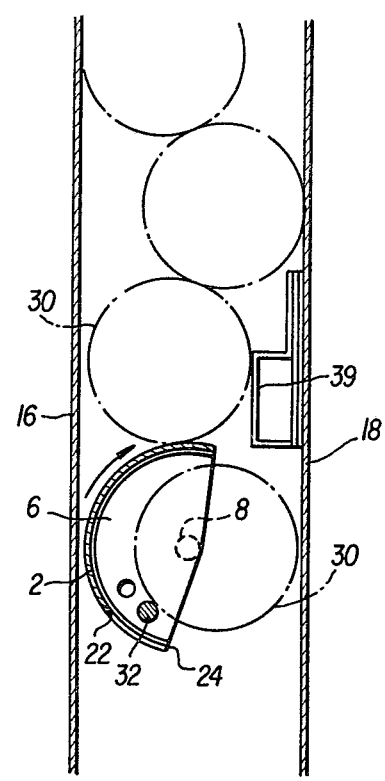
Figure 11:
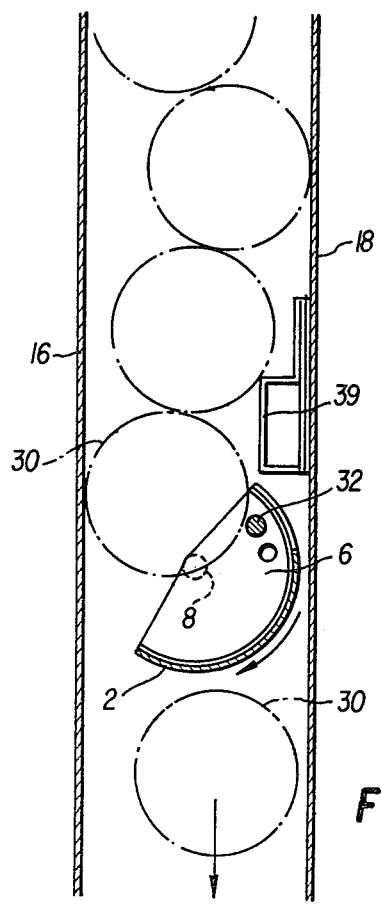

Referring now to FIGS. 9–11, as shown in these figures the cans 26 in front and rear columns have been replaced by bottles 30 in a single column above the cradle 2. The bottles 30 are longer than the cans 26 and thus only a single bottle can be received in the cradle at a time. To adapt the apparatus for dispensing of such bottles, which are conventionally of smaller diameter than cans, a support rod 32 is mounted in the cradle in the position generally shown in FIG. 9 to hold the bottle 30 in an elevated position, rather than letting it rest on the bottom of the interior of the cradle 2. The rod or support 32 is positioned so that the upper side of the bottle therein lies substantially at the imaginary outer periphery of the cylinder defined by the cradle, and thus the straight leading edge 20 of the cradle can readily and easily enter between the bottle 30 in the cradle and the column of bottles thereabove to support the same without having to unduly lift the weight of the column during rotation. A projection 39 is mounted on the right hand wall 18 of the compartment and this forces the bottom bottle of the column above the cradle to the left, so that it rests on the bottle in the cradle substantially directly above the same and in position to be easily separated by projecting the edge 20 between the bottles.

FIG. 9 shows the apparatus with the parts in position between dispensing cycles.

FIG. 10 shows the apparatus when operated through a partial cycle and wherein the support 32 is still in position to retain the bottle 30 between that support and the sidewall 18, the column of bottles above the cradle now being supported by the cradle. Continued rotation of the cradle in the clockwise direction will move the support 32 sufficiently far from the wall 18 to permit the bottle 30 therein to drop to the delivery station while the periphery of the bottom part of the cradle still supports the column of bottles thereabove. As the cradle continues to rotate to the position of FIG. 11, the support 32 moves far enough away from the wall 16 to permit the bottom bottle 30 of the column of bottles to drop into the cradle, and the latter is then stopped when it reaches the position shown in FIG. 9. It is to be noted that each cycle of operation, when dispensing bottles, comprises a complete revolution of the cradle.

Figure 6:
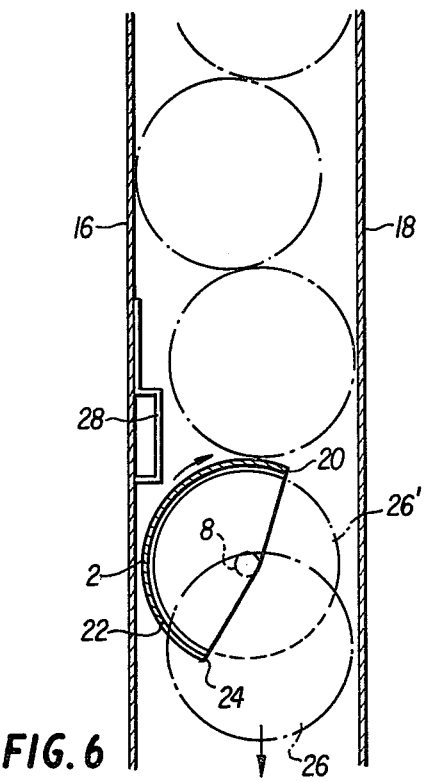

While no means have been shown for stopping the cradle in its front column dispensing position shown in FIG. 6, it is to be understood that the mechanism for doing so is old and well known in the art. Dispensing machines of this type have been constructed wherein a drive motor operates under control of a cam having adjustable features whereby it can be stopped at any point in its rotation or permitted to complete a full turn before being stopped.

Referring now to FIGS. 3 and 4, the support or rod 32 is shown in greater detail and it is to be noted that the end walls 6 and 4 of the cradle are provided with openings 34 and 36 therein, the openings 34 being axially aligned, as are the openings 36.

A support rod 32 is of reduced diameter at one end 38, and projects into an opening 34 or 36 of smaller diameter than the rod 32. Thus, a shoulder on the rod limits axial movements of the rod toward that end wall. The other end of the rod 32 is surrounded by a compression spring 40 anchored in a recess or channel 42 in the rod, and which normally projects slightly beyond the end of the rod 32. The openings 34 and 36 in the end wall 6 are sufficiently large to receive the end of the rod 32 and the spring 40 may be axially compressed sufficiently to permit the reduced end 38 of the rod to slide downwardly within the end wall 4 and thereafter to be projected outwardly through an opening 34 in that end wall. Openings 34 and 36 are provided whereby the cradle may be adapted to dispense bottles or articles of somewhat different diameters.

While a single specific embodiment of the invention has been shown and described herein, the same is merely illustrative of the principles involved and other forms may be employed within the scope of the appended claims.

I claim:

1. In a vending machine:

means defining a compartment adapted to hold front and rear columns of cylindrical articles of predetermined diameter;

a dispensing cradle in the lower end portion of said compartment and comprising a hollow, open-sided semicylindrical cradle extending from front to rear of said compartment and mounted for rotation about its axis, said axis extending from front to rear of said compartment;

said cradle having a straight axially extending leading edge and a stepped trailing edge for sequentially dispensing articles therein from between said stepped edge and a compartment wall, and sequentially from said front and rear columns upon rotation of said cradle about its axis;

the internal diameter of said cradle being substantially equal to the diameter of said cylindrical articles whereby rotation of said cradle with cylindrical articles therein and columns of said articles thereabove will cause said leading edge to move between the articles in said cradle and those thereabove, without substantially lifting said column, to support the latter while sequentially dispensing those in the cradle.

2. A vending machine as defined in claim 1 wherein the interior of said cradle is free of transverse partitions whereby said compartment may selectively contain a single column of alternate articles longer than said cylindrical articles.

3. A vending machine as defined in claim 2 including means for removably mounting a support member in said cradle in position to support alternate articles, of less diameter than said cylindrical articles, with their upper surfaces radially outwardly of said cradle at least to the cylinder defining the outer surface of said cradle.

4. A vending machine as defined in claim 3 wherein said cradle is provided with transverse walls at its axial ends, said means for mounting said support member comprising axially aligned openings in said end walls.

5. A vending machine as defined in claim 4 wherein said support member is an elongated rod arranged with its ends in said openings.

6. A vending machine as defined in claim 5 wherein one of said openings is of smaller diameter than the other, the end of said rod in said one opening being of reduced diameter and defining a shoulder on said rod abutting the end wall having said one opening, and resilient means urging said shoulder toward said one opening.

7. A vending machine as defined in claim 1 wherein said compartment is of a width greater than the diameter of the articles of a column of articles therein, and removable means on at least one side wall of said compartment arranged to position at least the bottom article of a column above said cradle in predetermined position at one side of said compartment.

* * * * *